No. 739,371. PATENTED SEPT. 22, 1903.
A. S. ALLEN.
KNIFE.
APPLICATION FILED AUG. 8, 1903.
NO MODEL.
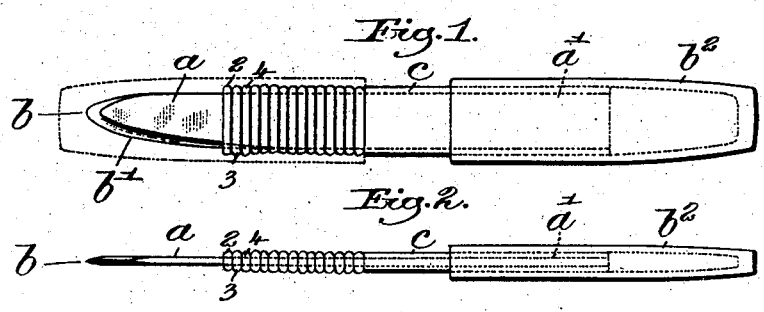

No. 739,371. Patented September 22, 1903.

UNITED STATES PATENT OFFICE.

ARTHUR SAMUEL ALLEN, OF BROOKLINE, MASSACHUSETTS.

KNIFE.

SPECIFICATION forming part of Letters Patent No. 739,371, dated September 22, 1903.

Application filed August 3, 1903. Serial No. 167,998. (No model.)

*To all whom it may concern:*

Be it known that I, ARTHUR SAMUEL ALLEN, a citizen of the United States, residing at Brookline, in the county of Norfolk and State of Massachusetts, have invented an Improvement in Knives, of which the following description, in connection with the accompanying drawings, is a specification, like letters on the drawings representing like parts.

This invention has for its object the production of a knife which, among other things, may be used to great advantage by printers in the operation of what is known as "making ready."

The object of my invention is to maintain the sharpened end of the blade always of substantially the same length, notwithstanding the shortening of the blade due to grinding.

In accordance with my invention I apply to the blade for the greater part of its length a shield that may be cut off from time to time as the blade is shortened by grinding. The shield will preferably be of a substantially hard non-metallic material—as, for instance, celluloid, hard rubber, or other recognized equivalents. This shield also serves to enable the user of the knife to grasp the blade as well as the handle and not be cut by the blade. The shield will preferably be corrugated to enable one section after another to be removed as the blade is shortened by grinding.

The handle is made as a cap that when the knife is not in use covers the sharpened blade and its attached shield, the cap when removed to use the knife being applied to the opposite unsharpened edge of the blade.

Figure 1, in side elevation, shows a knife embodying my invention, and Fig. 2 a top view of the same.

The blade $a$ of steel has a sharpened point $b$ and a sharpened edge $b'$. The right-hand end $a'$ of the blade is not sharpened. The blade is surrounded for a part of its length with a shield $c$, a portion of which is corrugated to leave detachable sections 2 3 4, &c., any or all of which may be removed from time to time as the blade is shortened by grinding. Corrugating portions of the shield and making the same of non-metallic material—such, for instance, as celluloid, hard rubber, or other known substitutes or equivalents that may be readily molded and secured to the blade—enables the sections to be readily detached, as may be necessary, one at a time, to uncover the proper length of blade at its sharpened end. This shield protects a portion of the sharpened edge of the blade, and the operator's hands may grasp the shield, thereby enabling him to hold the blade more firmly close to its acting end. When not in use, the sharpened point of the blade and portion of its cutting edge and the shield will be inclosed by a cap $b$, which may be of celluloid or hard rubber, the same being applicable to the point of the blade or to the end $a'$ thereof, as a cap is to a fountain-pen. When the blade is not in use the cap will occupy the dotted-line position shown in the drawings.

Having described my invention, what I claim, and desire to secure by Letters Patent, is—

1. A knife comprising a handle and blade, the blade having a shield applied thereto capable of being shortened as the length of the blade is reduced due to grinding.

2. A knife comprising a handle and blade, the blade having a corrugated shield applied thereto capable of being shortened as the length of the blade is reduced due to grinding.

3. The combination with a blade of a protecting-sleeve of hard material substantially as described capable of being shortened on the blade.

In testimony whereof I have signed my name to this specification in the presence of two subscribing witnesses.

ARTHUR SAMUEL ALLEN.

Witnesess:
GEO. W. GREGORY,
EDITH M. STODDARD.